US012415432B2

(12) United States Patent
Yokoyama et al.

(10) Patent No.: US 12,415,432 B2
(45) Date of Patent: Sep. 16, 2025

(54) CHARGING CONTROL SYSTEM, CHARGING CONTROL APPARATUS, AND COMPUTER READABLE RECORDING MEDIUM

(71) Applicant: TOYOTA JIDOSHA KABUSHIKI KAISHA, Toyota (JP)

(72) Inventors: Daiki Yokoyama, Gotemba (JP); Daiki Kawachino, Sunto-gun (JP); Shota Tsukamoto, Susono (JP); Rie Yayabe, Susono (JP); Masaaki Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 928 days.

(21) Appl. No.: 17/525,226

(22) Filed: Nov. 12, 2021

(65) Prior Publication Data
US 2022/0161674 A1    May 26, 2022

(30) Foreign Application Priority Data
Nov. 24, 2020    (JP) .................. 2020-194668

(51) Int. Cl.
| | | |
|---|---|---|
| H02J 7/00 | (2006.01) | |
| B60L 53/16 | (2019.01) | |
| B60L 53/30 | (2019.01) | |
| B60L 53/66 | (2019.01) | |
| H02J 7/14 | (2006.01) | |

(52) U.S. Cl.
CPC ............. *B60L 53/305* (2019.02); *B60L 53/16* (2019.02); *B60L 53/66* (2019.02)

(58) Field of Classification Search
CPC ......... B60L 53/305; B60L 53/66; B60L 53/16
USPC ......................................................... 320/139
See application file for complete search history.

(56) References Cited

U.S. PATENT DOCUMENTS

| | | | |
|---|---|---|---|
| 10,798,174 B2 | 10/2020 | Shao | |
| 11,441,917 B2* | 9/2022 | Cun | ........................ B60L 53/62 |
| 11,453,298 B2* | 9/2022 | Erikson | ................... B60L 53/62 |

(Continued)

FOREIGN PATENT DOCUMENTS

| | | |
|---|---|---|
| CN | 102770304 A | 11/2012 |
| JP | 2010-175492 A | 8/2010 |

(Continued)

*Primary Examiner* — Alexis B Pacheco
(74) *Attorney, Agent, or Firm* — Oblon, McClelland, Maier &Neustadt, L.L.P.

(57) ABSTRACT

A charging control system includes: a charging apparatus including a first processor, the charging apparatus being configured to store electric power to be supplied in a predetermined area; a charging stand provided in the predetermined area and including a second processor, the charging stand being configured to supply the electric power supplied from the charging apparatus to one or more electric vehicles in the predetermined area; and a charging control apparatus including a third processor, the third processor being configured to calculate number of the one or more electric vehicles in the predetermined area, calculate a charging amount of the charging apparatus based on the calculated number of the one or more electric vehicles, and perform charging control of the charging apparatus based on the calculated charging amount.

2 Claims, 2 Drawing Sheets

(56) References Cited

U.S. PATENT DOCUMENTS

| | | | | |
|---|---|---|---|---|
| 2011/0202418 A1* | 8/2011 | Kempton | B60L 53/63 | 705/26.1 |
| 2012/0112698 A1* | 5/2012 | Yoshimura | G06Q 30/06 | 320/109 |
| 2012/0203726 A1* | 8/2012 | Klabjan | G06Q 10/06 | 706/46 |
| 2012/0245750 A1* | 9/2012 | Paul | H02J 3/003 | 700/291 |
| 2012/0306446 A1* | 12/2012 | Suganuma | B60L 53/30 | 701/119 |
| 2012/0316717 A1* | 12/2012 | Daum | B60L 55/00 | 701/22 |
| 2013/0006677 A1* | 1/2013 | Anglin | G05F 5/00 | 320/109 |
| 2013/0222158 A1* | 8/2013 | Dai | B60L 53/14 | 340/995.13 |
| 2013/0253746 A1* | 9/2013 | Choi | B60L 53/63 | 701/22 |
| 2014/0062401 A1* | 3/2014 | Gadh | B60L 53/67 | 320/109 |
| 2015/0130296 A1* | 5/2015 | Washiro | B60L 53/63 | 307/140 |
| 2015/0298565 A1* | 10/2015 | Iwamura | G06Q 10/04 | 701/22 |
| 2018/0201148 A1* | 7/2018 | Donnelly | G05D 1/0088 | |
| 2018/0202825 A1* | 7/2018 | You | G08G 1/20 | |
| 2020/0101850 A1* | 4/2020 | Harty | B60L 55/00 | |
| 2020/0309562 A1* | 10/2020 | Zhong | G01C 21/3697 | |
| 2021/0046839 A1* | 2/2021 | Logvinov | B60L 53/63 | |
| 2021/0155107 A1* | 5/2021 | Yan | B60L 53/67 | |
| 2021/0188114 A1* | 6/2021 | Ferguson | H02J 7/005 | |
| 2021/0302480 A1* | 9/2021 | Pontefract | B60L 55/00 | |
| 2022/0005113 A1* | 1/2022 | Kimura | G06Q 10/02 | |
| 2022/0305942 A1* | 9/2022 | Mannepalli | B60L 53/68 | |
| 2022/0311271 A1* | 9/2022 | Kitamoto | H02J 7/0048 | |

FOREIGN PATENT DOCUMENTS

| | | |
|---|---|---|
| JP | 2011-24333 A | 2/2011 |
| JP | 2013-069084 A | 4/2013 |
| JP | 2019-531529 A | 10/2019 |
| WO | WO 2011/102515 A1 | 8/2011 |

\* cited by examiner

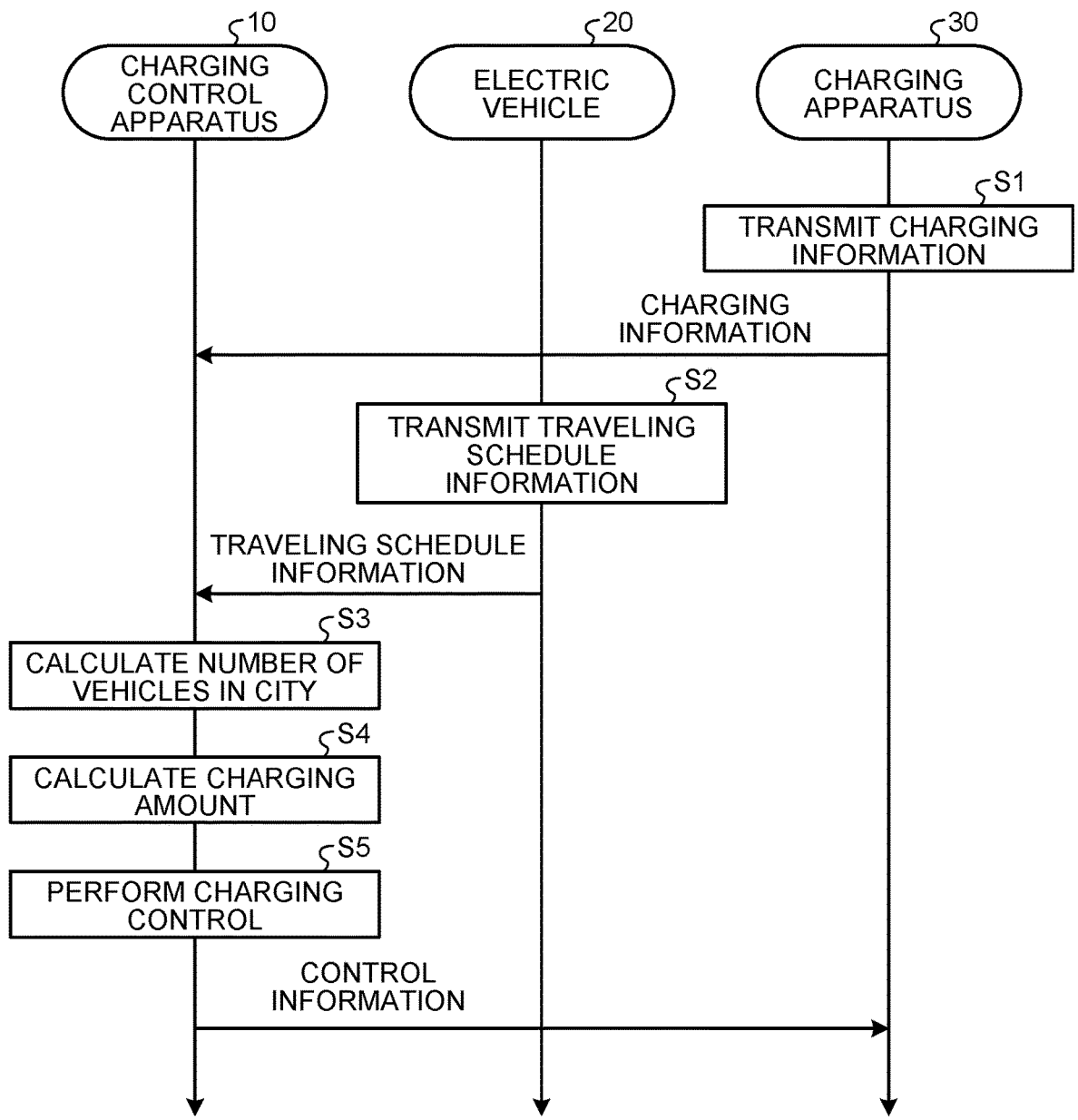

CHARGING CONTROL SYSTEM, CHARGING CONTROL APPARATUS, AND COMPUTER READABLE RECORDING MEDIUM

The present application claims priority to and incorporates by reference the entire contents of Japanese Patent Application No. 2020-194668 filed in Japan on Nov. 24, 2020.

BACKGROUND

The present disclosure relates to a charging control system, a charging control apparatus, and a computer readable recording medium.

There is a known technique for supplying electric power stored in a charging apparatus in advance to electric vehicles (for example, a battery electric vehicle, a plug-in hybrid electric vehicle, and the like) positioned in a smart city.

SUMMARY

In the smart city, a charging stand for charging the electric vehicles entering and leaving the smart city is provided.

There is a need for a charging control system, a charging control apparatus, and a computer readable recording medium that are able to handle charging requests from a large number of electric vehicles entering and leaving a smart city.

According to one aspect of the present disclosure, there is provided a charging control system including: a charging apparatus including a first processor, the charging apparatus being configured to store electric power to be supplied in a predetermined area; a charging stand provided in the predetermined area and including a second processor, the charging stand being configured to supply the electric power supplied from the charging apparatus to one or more electric vehicles in the predetermined area; and a charging control apparatus including a third processor, the third processor being configured to calculate number of the one or more electric vehicles in the predetermined area, calculate a charging amount of the charging apparatus based on the calculated number of the one or more electric vehicles, and perform charging control of the charging apparatus based on the calculated charging amount.

BRIEF DESCRIPTION OF THE DRAWINGS

FIG. 2 is a flowchart illustrating an example of a charging control method performed by the charging control system according to the embodiment.

DETAILED DESCRIPTION

Figure 1:
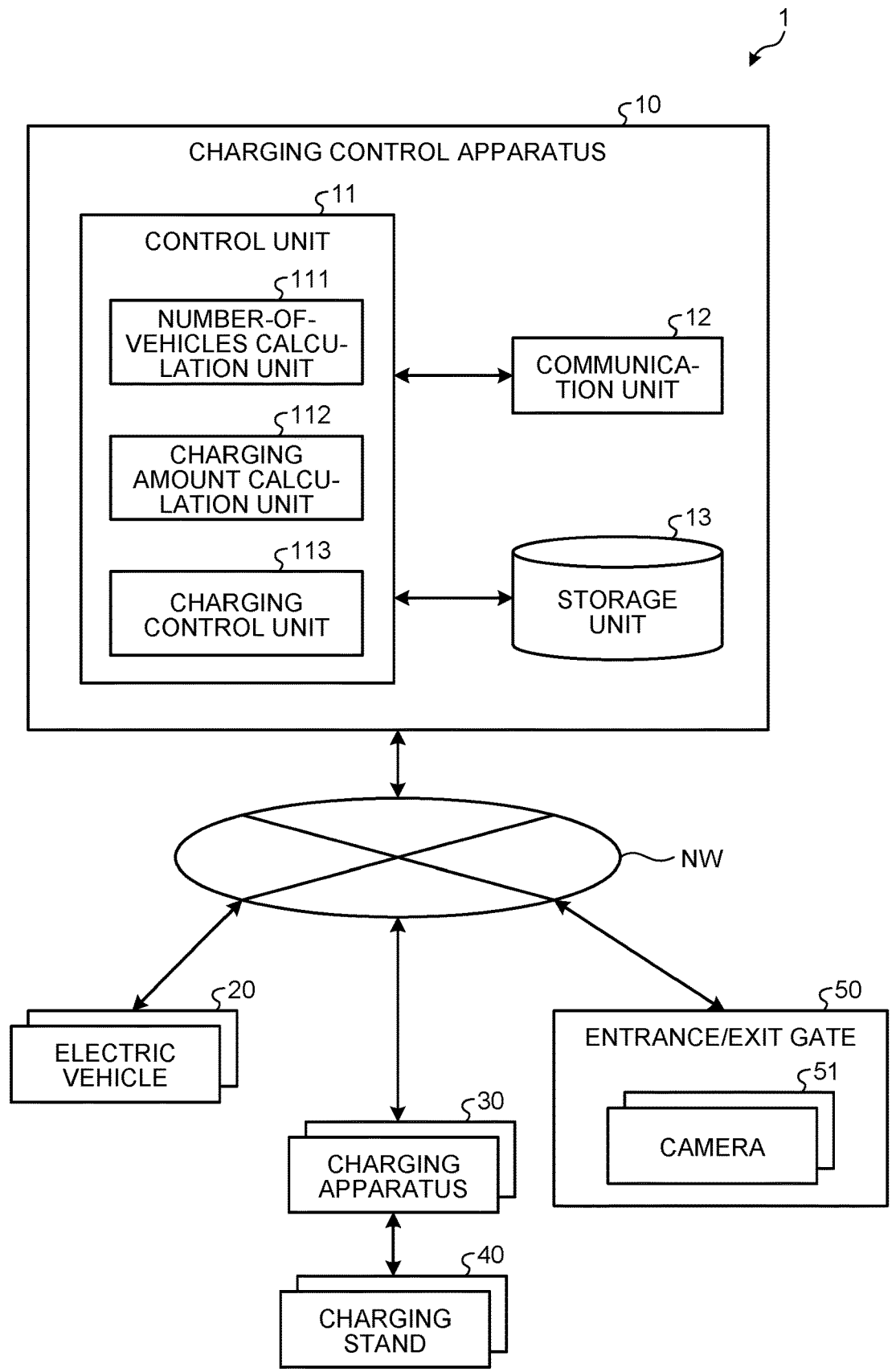
FIG. 1 is a block diagram illustrating a charging control system according to an embodiment.

A charging control system, a charging control apparatus, and a computer readable recording medium storing a charging control program according to an embodiment of the present disclosure will be described with reference to the drawings. Note that, the constituent elements in the following embodiment include those that may be easily replaced by those skilled in the art or are substantially the same.

A charging control system including a charging control apparatus according to the embodiment will be described with reference to FIG. 1. The charging control system performs charging control of a charging apparatus that supplies electric power to a preset area. The "preset area" is an area where a large number of users live or that a large number of users use and is, for example, a smart city, a theme park, an amusement park, or the like. The present embodiment is described on the assumption that the area is a smart city.

As illustrated in FIG. 1, a charging control system 1 includes a charging control apparatus 10, a plurality of electric vehicles 20, a plurality of charging apparatuses 30, and an entrance/exit gate 50. The charging control apparatus 10, the electric vehicles 20, the charging apparatuses 30, and the entrance/exit gate 50 each have a communication function and are configured to be communicable with each other via a network NW. This network NW is implemented by, for example, an Internet network, a mobile phone network, or the like.

The charging control apparatus 10 is provided inside the smart city or outside the smart city. The charging control apparatus 10 is implemented by a general-purpose computer, such as a workstation or a personal computer.

As illustrated in FIG. 1, the charging control apparatus 10 includes a control unit 11, a communication unit 12, and a storage unit 13. The control unit 11 specifically includes a processor implemented by a central processing unit (CPU), a digital signal processor (DSP), a field-programmable gate array (FPGA) or the like, and a memory (main storage unit) implemented by a random access memory (RAM), a read only memory (ROM), or the like.

The control unit 11 loads and executes a program stored in the storage unit 13 in the work area of the main storage unit and controls each component or the like through the execution of the program to implement a function matching a predetermined purpose. The control unit 11 functions as a number-of-vehicles calculation unit 111, a charging amount calculation unit 112, and a charging control unit 113 through the execution of the program stored in the storage unit 13.

The number-of-vehicles calculation unit 111 calculates the number of the electric vehicles 20 in a preset area (hereinafter, referred to as a "smart city"). A specific method of calculating the number of the electric vehicles 20 by the number-of-vehicles calculation unit 111 is not particularly limited, and various prediction methods may be used.

For example, the number-of-vehicles calculation unit 111 may calculate the number of the electric vehicles 20 in the smart city based on a future scheduled travel route of each electric vehicle 20. In this case, the vehicle number-of-vehicles calculation unit 111 acquires, from each electric vehicle 20, information regarding a destination or a waypoint of the electric vehicle 20 (hereinafter, referred to as "traveling schedule information") via the network NW. Then, the number-of-vehicles calculation unit 111 refers to the traveling schedule information and calculates, as the number of the electric vehicles 20 in the smart city, the number of the electric vehicles 20 setting the smart city as the destination or the waypoint.

In addition, the number-of-vehicles calculation unit 111 may calculate the number of the electric vehicles 20 in the smart city based on position information about each electric vehicle 20. In this case, the vehicle number-of-vehicles calculation unit 111 acquires, from each electric vehicle 20, information regarding the current position of the electric vehicle 20 (hereinafter, referred to as "vehicle position information") via the network NW. Then, the vehicle number-of-vehicles calculation unit 111 calculates the number of the electric vehicles 20 in the smart city based on the acquired vehicle position information. Note that, the vehicle position information is acquired by, for example, a GPS receiver mounted on each electric vehicle 20. In this manner, by using the position information about each electric vehicle 20, it is possible to easily calculate the number of the electric vehicles 20 entering and leaving the smart city.

In addition, the number-of-vehicles calculation unit 111 may actually count the number of the electric vehicles 20 entering and leaving the smart city. In this case, the number-of-vehicles calculation unit 111 acquires an image of the electric vehicles 20 passing through the entrance/exit gate 50 from a camera 51 provided at the entrance/exit gate 50. Then, the vehicle number-of-vehicles calculation unit 111 performs image processing on the image to discriminate the electric vehicles 20 and calculates the number of the electric vehicles 20 in the smart city based on the discrimination result. The entrance/exit gate 50 is provided at the entrance of the smart city. In this manner, by using the image by the camera 51 provided at the entrance/exit gate 50, it is possible to more accurately calculate the number of the electric vehicles 20 entering and leaving the smart city.

In addition, the number-of-vehicles calculation unit 111 may calculate only the number of the electric vehicles 20 that need to be charged among the electric vehicles 20 entering and leaving the smart city. In this case, the number-of-vehicles calculation unit 111 calculates the number of the electric vehicles 20 in the smart city by using any one of (1) a method using the future scheduled travel routes of the electric vehicles 20, (2) a method using the position information about the electric vehicles 20, and (3) a method of actually counting the number of the electric vehicles 20 entering and leaving the smart city. Subsequently, the number-of-vehicles calculation unit 111 acquires, from each electric vehicle 20 in the smart city, information regarding the remaining electric power of the electric vehicle 20 (hereinafter, referred to as "SOC information") via the network NW. Then, the number-of-vehicles calculation unit 111 refers to the SOC information and calculates the number of the electric vehicles 20 whose remaining electric power is equal to or less than a preset value. In this manner, by calculating only the number of the electric vehicles 20 that need to be charged, it is possible to prevent excessive electric power from being stored in the charging apparatuses 30.

The charging amount calculation unit 112 calculates the charging amount of the charging apparatuses 30 based on the number of the electric vehicles 20 calculated by the number-of-vehicles calculation unit 111. The charging amount calculation unit 112 calculates the charging amount of the charging apparatuses 30 by, for example, multiplying a preset charging amount for one electric vehicle 20 by the number of the electric vehicles 20 calculated by the number-of-vehicles calculation unit 111.

In addition, the charging amount calculation unit 112 may calculate the charging amount of the charging apparatuses 30 in consideration of the remaining electric power of each electric vehicle 20 in addition to the number of the electric vehicles 20. In this case, the charging amount calculation unit 112 acquires the SOC information from each electric vehicle 20 in the smart city via the network NW. Then, the charging amount calculation unit 112 calculates the charging amount of the charging apparatuses 30 based on the number of the electric vehicles 20 calculated by the number-of-vehicles calculation unit 111 and the SOC information. In this manner, by calculating the charging amount in consideration of the remaining electric power of each electric vehicle 20, it is possible to prevent excessive electric power from being stored in the charging apparatuses 30.

The charging control unit 113 performs charging control of the charging apparatuses 30 based on the charging amount calculated by the charging amount calculation unit 112. The charging control unit 113 performs charging control by storing, in the charging apparatuses 30, the electric power corresponding to the charging amount calculated by the charging amount calculation unit 112. A specific method of the charging control by the charging control unit 113 is not particularly limited, and the charging control may be performed by, for example, determining a final charging amount based on the charging amount calculated by the charging amount calculation unit 112 and on charging information (for example, a current charging capacity or the like) acquired in advance from the charging apparatuses 30 and transmitting, to each charging apparatus 30, a command to increase or decrease a current or future charging amount according to the final charging amount.

The communication unit 12 is implemented by, for example, a local area network (LAN) interface board, a wireless communication circuit for wireless communication, or the like. The communication unit 12 is connected to the network NW such as the Internet, which is a public communication network. Then, the communication unit 12 connects to the network NW to communicate with the electric vehicles 20, the charging apparatuses 30, and the entrance/exit gate 50.

The storage unit 13 is implemented by recording media, such as an erasable programmable ROM (EPROM), a hard disk drive (HDD), a removable medium, and the like. Example of the removable media include disc recording media, such as a universal serial bus (USB) memory, a compact disc (CD), a digital versatile disc (DVD), and a Blu-ray (registered trademark) disc (BD). The storage unit 13 may store an operating system (OS), various programs, various tables, various databases, and the like. The storage unit 13 further stores, for example, the number of the electric vehicles 20 calculated by the number-of-vehicles calculation unit 111, the charging amount calculated by the charging amount calculation unit 112, the charging amount of the charging apparatuses 30 determined by the charging control unit 113, and the like as necessary.

The electric vehicles 20 each are a moving body capable of communicating with the outside. The electric vehicles 20 each are implemented by a battery electric vehicle or a plug-in hybrid electric vehicle that may be charged from an external power supply. The electric vehicles 20 each transmit the vehicle position information and the SOC information to the charging control apparatus 10 sequentially or at a predetermined cycle as necessary.

The charging apparatuses 30 each store electric power to be supplied to the equipment in the smart city and are provided inside the smart city or outside the smart city. The charging apparatuses 30 are each connected to a charging stand 40 provided in the smart city and are configured to be able to supply electric power to the charging stand 40.

The charging apparatuses 30 are each implemented by a general-purpose computer such as a workstation, a personal computer, and the like. In addition, the charging apparatuses 30 each include a battery for storing electric power, a control mechanism for controlling charging and discharging of electric power, and the like. In addition, the charging apparatuses 30 each transmit current charging information regarding each charging apparatus 30 to the charging control apparatus 10 sequentially or at a predetermined cycle.

The charging stand 40 supplies electric power to the electric vehicles 20 in the smart city and is implemented by, for example, a contact type charging stand, a non-contact type charging stand, or the like.

The entrance/exit gate 50 is provided at the entrance of the smart city. The entrance/exit gate 50 is provided with a plurality of cameras 51 that photographs the electric vehicles 20 passing through the entrance/exit gate 50. The entrance/exit gate 50 transmits the images photographed by the cameras 51 to the charging control apparatus 10 sequentially or at a predetermined cycle.

An example of a processing procedure of a charging control method performed by the charging control system 1 according to the embodiment will be described with reference to FIG. 2. Note that, the following is a description of an example of calculating the number of the electric vehicles 20 in the smart city based on future scheduled travel routes of the electric vehicles 20.

First, each charging apparatus 30 transmits charging information to the charging control apparatus 10 (step S1). Then, each electric vehicle 20 transmits traveling schedule information to the charging control apparatus 10 (step S2). Note that, the order of steps S1 and S2 may be reversed.

Then, the number-of-vehicles calculation unit 111 of the charging control apparatus 10 refers to the traveling schedule information and calculates, as the number of the electric vehicles 20 in the smart city, the number of the electric vehicles 20 setting the smart city as a destination or a waypoint (step S3). Then, the charging amount calculation unit 112 calculates a charging amount based on the number of the electric vehicles 20 calculated in step S3 (step S4). Then, the charging control unit 113 performs charging control of the charging apparatuses 30 based on the charging amount calculated in step S4 (step S5). With the above steps, the processing of the charging control method is completed.

As described above, with the charging control system, the charging control apparatus, and the charging control program according to the embodiment, it is possible to handle charging requests from a large number of the electric vehicles 20 entering and leaving the smart city.

That is, the charging control system, the charging control apparatus, and the charging control program according to the embodiment perform the charging control of the charging apparatuses 30 in consideration of the number of the electric vehicles 20 entering and leaving the smart city. Accordingly, if there are a large number of the electric vehicles 20, electric power to be supplied to the equipment and facilities in the smart city does not run short.

In addition, the charging control system, the charging control apparatus, and the charging control program according to the embodiment do not simply predict an electric power demand in the smart city but predict (calculate) the number of the electric vehicles 20 entering and leaving the smart city and take the result into consideration. Accordingly, it is possible to more appropriately perform the charging control of the charging apparatuses 30.

According to the present disclosure, it is possible to handle charging requests from a large number of electric vehicles entering and leaving a smart city.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charging control apparatus comprising
a processor configured to:
    calculate number of one or more electric vehicles in a preset area;
    calculate, based on the calculated number of the one or more electric vehicles, a charging amount of a charging apparatus configured to supply electric power to the one or more electric vehicles through a charging stand provided in the preset area;
    perform charging control of the charging apparatus based on the calculated charging amount;
    acquire information about a destination or a waypoint of each of the one or more electric vehicles traveling both within and outside the preset area; and
    calculate, as the number of the one or more electric vehicles in the preset area, the number of the one or more electric vehicles setting the preset area as the destination or the waypoint.

2. The charging control apparatus according to claim 1, wherein the processor is configured to:
    acquire information regarding remaining electric power of each of the one or more electric vehicles in the preset area; and
    calculate a charging amount of the charging apparatus based on the calculated number of the one or more electric vehicles and the information regarding the remaining electric power of each of the one or more electric vehicles.

* * * * *